US005211735A

United States Patent [19]

Costa et al.

[11] Patent Number: 5,211,735

[45] Date of Patent: May 18, 1993

[54] PROCESS FOR PREPARING PHOSPHATED OR NITROPHOSPHATED FERTILIZERS THROUGH SOLUBILIZATION OF PHOSPHATE ROCK

[75] Inventors: Fabio G. M. Costa; Alberto C. C. Da Silva; Paulo C. W. De Albuquerque; Alberto Laranjeira, all of Rio de Janeiro, Brazil

[73] Assignee: Petroleo Brasileiro S. A., Rio de Janeiro, Brazil

[21] Appl. No.: 746,201

[22] Filed: Aug. 15, 1991

Related U.S. Application Data

[63] Continuation of Ser. No. 185,744, Apr. 25, 1988, abandoned.

[30] Foreign Application Priority Data

Apr. 24, 1987 [BR] Brazil .................................. 8701944

[51] Int. Cl.[5] ....................... C05B 11/08; C01B 25/26

[52] U.S. Cl. .......................................... 71/40; 71/41; 71/43; 423/159.4; 423/304; 423/319; 423/320

[58] Field of Search .............. 423/167, 308, 309, 319, 423/320

[56] References Cited

U.S. PATENT DOCUMENTS

| | | | |
|---|---|---|---|
| 1,982,480 | 11/1934 | Pfaff | 259/4 |
| 1,986,293 | 1/1935 | Shoeld | 71/7 |
| 2,021,671 | 11/1935 | Skinner | 23/109 |
| 2,902,342 | 9/1959 | Kerley, Jr. | 71/43 X |
| 2,937,937 | 5/1960 | Dunbar | 71/41 |
| 2,971,831 | 2/1961 | Martin | 71/40 |
| 3,002,831 | 10/1961 | Gross et al. | 71/64 |
| 3,005,696 | 10/1961 | Hignett et al. | 71/64 |
| 3,034,883 | 5/1962 | Hignett et al. | 71/37 |
| 3,041,158 | 6/1962 | Boylan et al. | 71/40 |
| 3,125,435 | 3/1964 | Alfres et al. | 71/64 |
| 3,241,945 | 3/1966 | Sanders et al. | 71/41 |
| 3,249,421 | 5/1966 | Bigot et al. | 71/41 |
| 3,328,159 | 6/1967 | Moraillon et al. | 71/37 |
| 3,351,453 | 11/1967 | Moore et al. | 71/34 |
| 3,607,214 | 9/1971 | Suillo | 71/34 |
| 3,730,700 | 5/1973 | Groenveld | 71/34 |
| 4,462,972 | 7/1984 | Satterwhite | 71/37 X |
| 4,469,504 | 9/1984 | Adbel-Hehim et al. | 423/319 |
| 4,523,941 | 6/1985 | Abdel-Hehim et al. | 71/37 |
| 4,568,374 | 2/1986 | Carneiro da Silva | 71/36 |
| 4,604,126 | 8/1986 | Moraillon | 71/64.06 X |

FOREIGN PATENT DOCUMENTS

| | | | |
|---|---|---|---|
| 0652157 | 3/1979 | U.S.S.R. | 71/41 |
| 0701979 | 12/1979 | U.S.S.R. | 71/41 |
| 0785280 | 12/1980 | U.S.S.R. | 71/41 |
| 1068405 | 1/1984 | U.S.S.R. | 71/41 |
| 357508 | 9/1931 | United Kingdom . | |
| 668269 | 3/1952 | United Kingdom . | |

*Primary Examiner*—Ferris Lander

*Attorney, Agent, or Firm*—Sughrue, Mion, Zinn, Macpeak & Seas

[57] ABSTRACT

The invention aims at a process for preparing phosphated or nitrophosphated fertilizers through reaction of phosphate rock in aqueous pulp, with sulfuric and/or phosphoric acids, with addition, or not, of ammonia, so as to produce fertilizers of the types simple, double or triple superphosphates, nitrogen-bearing (or not) phosphated partially acidulated, and superphosphated ammoniated, the product being adequate for use as a fertilizer, either powdered or slurried.

The invention allows for a more complete reaction due to the better contact between the liquid and solid reagents besides the complete utilization of the heat produced in the reaction as well as in the acid dilution in the aqueous medium, for the vaporization of the water present in the process.

10 Claims, 1 Drawing Sheet

PROCESS FOR PREPARING PHOSPHATED OR NITROPHOSPHATED FERTILIZERS THROUGH SOLUBILIZATION OF PHOSPHATE ROCK

This is a continuation of application Ser. No. 07/185,744 filed Apr. 25, 1988 and now abandoned.

FIELD OF THE INVENTION

The invention concerns a process for preparing phosphated or nitrophosphated fertilizers through total or partial solubilization of phosphate rock.

More particularly, the object of the invention is a simple and direct process of reacting phosphate rock with sulfuric or phosphoric acid, with or without addition of ammonia, originating a product that can be directly employed as a fertilizer (powdered or slurried).

DESCRIPTION OF THE PRIOR ART

Several processes employing phosphate rock are known within the technique for producing phosphated and nitrophosphated fertilizers.

In the field of phosphated fertilizers, processes heretofore known contemplate two basic variants: direct granulation or pre-mixing of the reagents followed by granulating or "denning" stages; by denning there should be understood the operations that consist in slowly transporting the material, usually under vacuum, aiming at hardening the product in order to impart to it handling conditions for subsequent steps.

Among the processes using pre-mixing operations two principal variations are known: surge vessel mixing and processing in double shaft, horizontal blade mixers, or in vertical mixers.

In the processes using surge vessels, powdered phosphate rock is added in a surging tank, where it is vigorously mixed with phosphoric acid, most often diluted. The mud thus formed is then overflown into a cylindrical, rotary hearth furnace, as described in U.S. Pat. No. 2,937,937, or pumped into a fluidized-bed drier/granulator, as appreciated in U.S. Pat. No. 3,607,214. These processing methods have the disadvantage of consuming a great deal of energy, required in order to eliminate the water in the reactional mud through drying operations.

In processes employing blade mixers, powdered rock and phosphoric or sulfuric acid are fed to the mixer. This mixer in turns feeds slow-motion rotary drums or belts (for the denning operation), or even a granulator.

In U.S. Pat. No. 3,328,159 and GB Patent 668269 there is a denning stage after the mixing, followed by granulating and drying operations. Classification and grinding fines are returned to the granulator or even to the mixer. These processes, which do not directly feed driers such as those implying mixing in surge vessels most often have very high recycling rates, some 10 to 20 times the plant output. However, those employing the denning operation achieve a reduction in the fines recycling rate, by reducing the humidity and increasing the hardening of the material in this type of operation, thus easing the granulating stage. Despite this fact, they have the disadvantages of a high residence time in the unit and a higher investment in equipment. Finally, reference should be made to other mixing and reaction processes, such as those of ball-mills or mixing valves.

U.S. Pat. Nos. 3,041,158 and 2,021,671 describe processes that perform the reaction between the powdered phosphate rock and sulfuric or phosphoric acid in a gas-heating equipped, tubular ball-mill. While this process may provide an increase in phosphorus conversion due to the grinding and acidulating operations being made in parallel, its cost is prohibitive in view of the energy consumption-intensive operations and may present serious scale crust problems if the operation control is not a stringent one.

U.S. Pat. Nos. 1,982,480 and 1,986,293, as well as GB Patent 357508 describe batch processes, with powdered phosphate rock and acid fed into a special mixer of the "valve" type, and subsequent feeding of the mixture to a digester, operating under pressure during the reaction, and under vacuum during the drying operations. Process control in these cases is extremely difficult because of the form in which the powdered rock is added (the rock is air-stream pumped or pressure-pumped). Moreover, the discontinuous technique is now obsolete.

Finally, worth quoting is the "inverted cone" type mixer, as described in the "Fertilizer Solutions Magazine"—July/August 1974—where powdered rock is added through a central tube in the cone and evenly distributed through a special device. The diluted acid is, in turn, fed tangentially to the cone walls, at four, equidistant points. This type of mixer most often implies coupled denning operations.

Among the direct granulation processes, those described in U.S. Pat. Nos. 3,002,831 and 2,971,831 are known, where powdered rock is fed into a granulator of the rotary drum type, with simultaneous spraying of sulfuric or phosphoric acid. Water vapor is added as needed. The process fines are recycled toward the granulator. Another process, described in U.S. Pat. No. 3,034,883, is characterized by the fact that the acid is fed underneath the grain bed through a distributor. The direct granulation processes are those most widely employed in the phosphated fertilizer industry today.

In the field of nitrophosphated fertilizers (not to be mistaken for nitric-phosphated fertilizers), there are basically three types of processes: those using a pre-neutralizer, those of direct ammoniation and granulation and those employing tubular reactors.

U.S. Pat. Nos. 3,241,945 and 3,005,696, 3,351,453 and 3,125,435 describe processes for producing ammoniated triple superphosphate or ammonium phosphates through ammonia injection under a bed of solids, either in a rotary drum granulator or in a pug-mill, with simultaneous spraying of phosphoric acid on the bed of solids. These processes most frequently dispense with drying operations, but have the disadvantage of requiring gas-washing systems, due to the high amounts of ammonia released in the granulators, where the degree of ammonia fixation is highly dependent on the granulometry and humidity of the solids, as well as on the degree of acid homogeneizing in the bed of solids.

U.S. Pat. No. 4,568,374 also describes a nitrophosphated fertilizer preparation process by direct granulation, with the difference that the nitrogen-bearing agent is the ammonium sulfate and that it is also characterized by the use of phosphate rock in aqueous pulp, directly extracted from a stage in the phosphate processing.

Processes using a pre-neutralizer, such as described in U.S. Pat. No. 3,249,421, are being gradually abandoned because of their greater complexity of control, inasmuch as ammonia is divided between this equipment and the granulator. Investment for this type of process is also fairly high.

Finally, the tubular reactor is the most recent development in this area, and has been successfully employed to produce ammonium phosphates and polyphosphates from phosphoric acid (or superphosphoric acid) and ammonia as per description in U.S. Pat. No. 3,730,700, as well as ammonium sulfate, from ammonia and sulfuric acid.

As a rule, in processes employing higher quantities of ammonia, a part of the ammonia is placed in the granulator or in a pre-neutralizer. The great advantage of this type of equipment is the good mixing of the reagents and the excellent conservation of energy, as the process often dispenses with the drying stage.

SUMMARY OF THE INVENTION

During the laboratory and pilot plant studies that have led to the development of the processes described in U.S. Pat. Nos. 4,469,504, 4,523,941 and 4,568,374, the applicant has observed that the fact of employing phosphate rock in the form of aqueous pulp along with ammonium sulfate and concentrated sulfuric acid in a continuous manner, in a "Y"-type mixer, with compressed air injection for atomization, used to give origin to a product with a high rate of conversion of phosphorus into the soluble form. In spite of that, the direct granulation process described in the abovementioned Patents had the same limitations, i.e., the need for drying and for adopting high fines recycling rates.

In order to by-pass this problem, a pilot-scale study was conducted with a view to employing a tubular reactor to produce phosphated or nitrophosphated fertilizers, starting with phosphate rock in aqueous pulp, liquid ammonia and concentrated sulfuric and/or phosphoric acids. Results obtained were positive and constitute a novelty, as, surprisingly enough, it was found that the operation with pulp rock in a tubular reactor presented the following advantages as related to the processes known theretofore:

better homogeneizing of the solid phase in the reactional medium, allowing for an evener, therefore more complete, reaction;

greater energy savings in the overall process, as it eliminates the need for rock drying at the final processing phase, uses the heat released by the rock, acid and ammonia mixing reaction, besides utilizing the heat released by the dilution of the same concentrated acids in the aqueous medium;

lower recycling rate and lesser need for additional drying as a function of this better utilization of energy, employed in the vaporization of the reactional mixing water;

better fixation of ammonia in the product, as a result of the operation under pressure and the higher content of water in the tubular reactor;

possibility of direct granulation, with fines recycling in a disk-, drum-, or pug-mill granulator, of the product discharged under pressure from the tubular reactor;

possibility of producing slurried fertilizer, after conditioning and enrichment with other fertilizers. Thus, the object of the present invention is a process to induce reaction of phosphate rock in aqueous pulp, with sulfuric and/or phosphoric acids, with or without addition of ammonia, to produce fertilizers of the superphosphate type, simple, double or triple, phosphated, partially acidulated, whether or not containing nitrogen, as well as ammoniated superphosphates.

BRIEF DESCRIPTION OF THE DRAWING

The invention is illustrated in the accompanying drawing, in which.

DETAILED DESCRIPTION OF THE INVENTION

Figure 1:
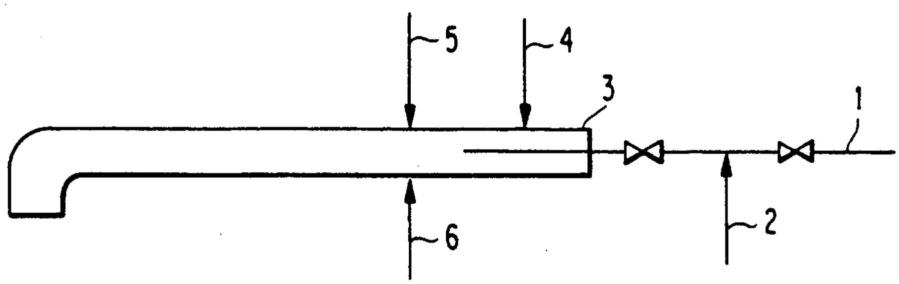
FIG. 1 shows the tubular reactor which was used in Example 1 and which can be used to obtain partially acidulated nitrogen-containing fertilizers.

According to the invention, phosphated or nitrophosphated fertilizers are prepared by reaction between phosphate rock and concentrated sulfuric and/or phosphoric acids, with or without ammonia addition, with the reaction conducted in a tubular reactor, where the phosphate rock is fed in the form of aqueous pulp, after being blended with ammonia in one end of said reactor, and the resulting mixture being made to react, at a farther point in the tubular reactor, with concentrated sulfuric and/or phosphoric acid streams.

Similarly, the invention makes it possible to perform said reaction in a tubular reactor, where phosphate rock is fed in the form of an aqueous pulp, and is reacted in one end of said tubular reactor with concentrated sulfuric and/or concentrated phosphoric acid streams the product thus resulting being made to react with an ammonia stream at a farther point in the tubular reactor.

It is also a part of the invention to carry the reaction in a tubular reactor, where the phosphate rock is fed in the form of aqueous pulp, and is reacted in an end of said tubular reactor with concentrated sulfuric acid and/or concentrated phosphoric acid streams.

Thus, the process object of the present invention allows for different operational layouts, all of them involving full utilization of the heat produced (both by the reaction and by the dilution of the acids in an aqueous medium) to vaporize the water present in the system; similarly, these layouts cause the reaction to be more complete, because of the better contact between the solid and liquid reagents.

Still according to the invention, ammonia undergoes a previous pressure-reducing operation up to an intermediate pressure condition upon receiving water addition, which makes it possible to reduce losses, control reactor temperature and reactional medium fluidity; the pressure of the mixture is again reduced to reactor's operating pressure.

In cases where a decrease in the process water or a higher temperature in the tubular reactor is desired, ammonia may be blended beforehand in the rock pulp line, after having its pressure reduced to said intermediate condition.

The aqueous rock pulp to be employed in the process of the invention may come from an intermediate stage of conventional phosphate rock processing, thus allowing for the elimination of the drying stage for the phosphate concentrate.

Similarly, the process makes it possible to obtain a product that can be easily granulated in conventional granulating equipments, or else directly employed in the formulation of slurried fertilizers.

The aqueous pulp to be employed should have a concentration comprised between 60 and 80% by weight of rock or, preferentially, between 65 and 70% by weight.

The sulfuric acid employed must be in a concentration between 95 and 98% by weight and the phosphoric acid between 51 and 55% $P_2O_5$ by weight.

The temperature in the tubular reactor shall be maintained between 70° and 150° C. or, preferably, between 90° and 100° C. The pressure in the tubular reactor is controlled by the discharge area of the outlet nozzle, so as to range between 2 and 5 kgf/cm$^2$ gauge, preferentially between 3 and 4 kgf/cm$^2$ gauge.

The ratios between raw materials for production of the different types of fertilizers are widely known through the specialized technical literature. In the special case of the partially acidulated nitrogen-containing fertilizer, the ratios are described in U.S. Pat. No. 4568374. Similarly, the constructive details of the tubular reactor have been described in other patents; their discussion here is, therefore, not pertinent.

FIG. 1 shows a first embodiment of the invention. This variant would be employed to obtain partially acidulated nitrogen-containing fertilizers of the type described in U.S. Pat. No. 4568374. According to the Figure, a stream (1) of liquid ammonia has its pressure reduced toward an intermediate pressure condition and receives process water addition through stream (2) for dilution, in order to minimize nitrogen losses in the process and control the temperature in the reactor. The water ammonia mixture has then its pressure reduced again to operating pressure in the tubular reactor, identified by number (3), and introduced in said reactor. There it receives addition of phosphate rock pulp (4) containing from 60 to 80% by weight of solids. Then, at a farther site in the tubular reactor, sulfuric acid (95–98%) and concentrated phosphoric acid (51–55% $P_2O_5$) are introduced, respectively through lines (5) and (6). One acid only may be added, or both of them. The overall mixture is allowed to react throughout the length of the tubular reactor, in a temperature range of between 70° and 150° C., whereupon it is discharged through a nozzle the diameter of which is such as to maintain the pressure in the tubular reactor between 2 and 5 kgf/cm$^2$ gauge.

Actually, the residence time, the temperature and the operating pressure of the tubular reactor shall be a function of the type of process employed, of the flow rates adopted, of the physical conditions desired for the final product and of the tendency towards scale crust onset within the equipment.

Figure 2:
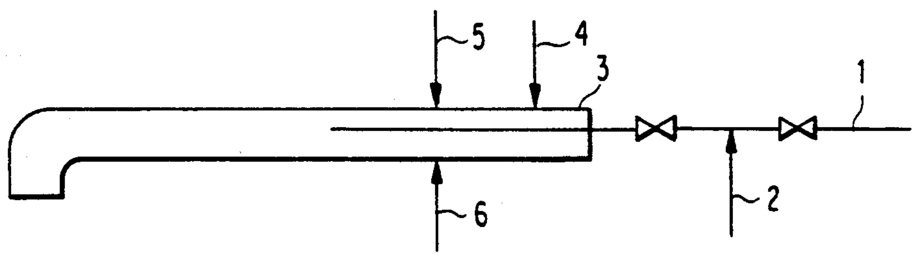
FIG. 2 shows the tubular reactor which was used in Example 2 and which can be used to obtain ammoniated phosphates.

FIG. 2 shows a second embodiment of the invention. The latter would be meant to obtain ammoniated phosphates. It is similar to that described in FIG. 1, but the ammonia injection is performed after blending of the acids with the rock pulp.

Figure 3:
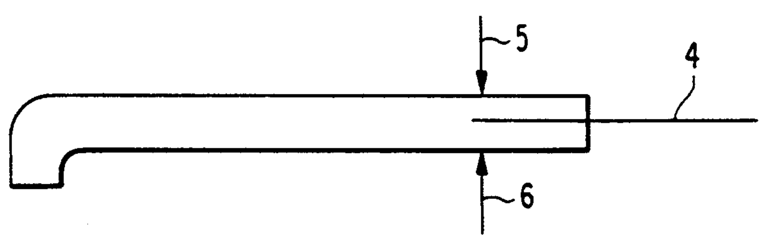
FIG. 3 shows the tubular reactor which was used in Example 3 and which can be used to obtain simple, double, or triple superphosphates.

FIG. 3 shows a third embodiment of the invention, meant to obtain simple, double or triple superphosphates. Obviously, the ammonia line is suppressed in this instance.

Figure 4:
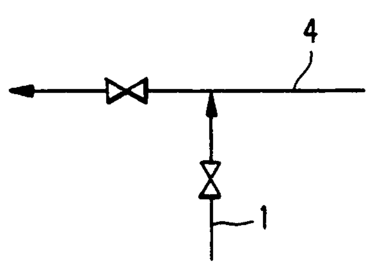
FIG. 4 shows a scheme which may be introduced in the tubular reactors shown in FIGS. 1 and 2.

In any embodiment presented in FIGS. 1 or 2 the scheme proposed in FIG. 4 may be introduced. In this layout the ammonia has its pressure reduced toward an intermediate pressure condition, then introduced in the rock pulp line (4) with the purpose, in this instance, of reducing the water in the formulation or increasing the temperature level in the reactor.

Hereunder are examples that simply illustrate, but do not limit, the present invention.

EXAMPLE 1

In a pilot, ¾" (19.05 mm) rated diameter, 39.3 in. (1 meter) long tubular reactor, were fed reagents according to the scheme shown in FIG. 1. A stream of liquid ammonia, with a 9 kgf/cm$^2$ gauge pressure, at room temperature, and 0.6 l/minute flow rate had its pressure reduced towards a 6 kgf/cm$^2$ gauge, with the temperature falling to 14° C. At this stage water was added through stream (2), at a 0.37 l/minute flow rate. The mixture was heated up to 50° C. and then had again its pressure reduced to the operating pressure of the reactor, i.e., 3.5 kgf/cm$^2$ gauge. In the tubular reactor, through stream (4), phosphate rock pulp was introduced at a 10 kg/minute flow rate, at room temperature. The pulp has been prepared beforehand with 23.5% total $P_2O_5$ Patos de Minas rock, and contained 65% by weight of solids. Through stream (5) 98% sulfuric acid (by weight) was fed to the tubular reactor, at room temperature and a 1.5 l/minute flow rate. The reactional mixture was discharged on a continuous basis from the reactor at the temperature of 100° C., showing a muddy aspect and having the following composition: 1.9% nitrogen, 12.3% total $P_2O_5$, 9.3% $P_2O_5$ soluble in a 2% citric acid solution, 19.5% humidity. This mixture may be directly employed in the manufacture of slurried fertilizers, or even granulated with recycle of dry solids.

EXAMPLE 2

In a tubular, pilot reactor similar to that described in Example 1, reagents were fed according to the scheme shown in FIG. 2. A stream (1) of liquid ammonia at a 9 kgf/cm$^2$ gauge pressure, at room temperature, 1.1 l/minute flow rate, had its pressure reduced toward a pressure of 6 kgf/cm$^2$ gauge, with the temperature falling to 15° C. At this stage water was added through stream (2), with the minimum flow rate required to fluidify the reactional mixture within the tubular reactor, operating at 3.5 kgf/cm$^2$ gauge. In the tubular reactor, through stream (4), phosphate rock pulp was introduced at a 11 kg/minute flow rate, at room temperature. The pulp had been prepared beforehand with 26.5% total $P_2O_5$ Patos de Minas rock, with 70% solids by weight. Through stream (5), the tubular reactor was also fed with 98% (by weight) of sulfuric acid at room temperature and a 1.7 l/minute flow rate. Finally, through stream (6) a 51% $P_2O_5$ solution of phosphoric acid at a 0.8 l/minute flow rate was fed to the tubular reactor. The reactional mixture was discharged from the reactor on a continuous basis at the temperature of 100° C., having the aspect of a powdery solid, easily processable into granular shape, with the following composition: 3.4% nitrogen, 19.7% total $P_2O_5$, 14.7% $P_2O_5$ soluble in neutral ammonium citrate solution and 3% humidity. This composition meets the Brazilian specification for simple, ammoniated superphosphate.

EXAMPLE 3

In a ¾" (19.05 mm) rated diameter, 39.3 in (1 meter)—long tubular pilot reactor, reagents were fed according to the scheme shown in FIG. 3. A stream of phosphate rock pulp (4) was introduced in same reactor, at room temperature and a 10.5 kg/minute flow rate at a 3.5 kgf/cm$^2$ gauge operating pressure. The pulp had been prepared beforehand with 36.5% total $P_2O_5$ Patos de Minas rock, with 70% solids by weight. Through stream (5) 98% sulfuric acid (by weight) was also fed to the tubular reactor, at room temperature at a 2 l/minute flow rate. The reactional mixture was discharged from the reactor on a continuous basis at the temperature of 90° C., presenting a muddy aspect and having the following composition: 14.29% total $P_2O_5$, 12.43% $P_2O_5$ soluble in a 2% citric acid solution and 21% humidity. This mixture may be directly employed in slurried fertilizer formulation, or even granulated with recycle of dry solids.

We claim:

1. A process for preparing phosphated or nitrophosphated fertilizer directly in a tubular reactor containing a reaction medium said process consisting essentially of the steps of:

(a) introducing phosphate rock as an aqueous pulp into said tubular reactor, wherein said aqueous pulp comprises between 60% and 80% by weight of said rock; and (b) introducing a stream of an acid selected from the group consisting of concentrated sulfuric acid, concentrated phosphoric acid, and a mixture thereof into said tubular reactor, wherein said pulp is mixed with said stream of acid and reacts throughout the length of said tubular reactor so as to produce said fertilizer directly, wherein the temperature within said tubular reactor is kept between 70° C. and 150° C. by ammonia addition or by water addition and wherein the pressure in said tubular reactor is controlled by means of the discharge area of the outlet nozzle of said reactor, so that the pressure is kept between 2 and 5 $kgf/cm^2$ gauge.

2. The process for preparing phosphated or nitrophosphated fertilizer according to claim 1 wherein said rock aqueous pulp comes from a preliminary step of the conventional processing of phosphate rock, so as to eliminate the drying step of the phosphate concentrate.

3. The process for preparing phosphated or nitrophosphated fertilizer according to claim 1 wherein said ammonia has its pressure reduced to an intermediate pressure condition and receives additional water and then has its pressure further reduced to the reactor operator pressure, thus reducing losses, controlling the reactor temperature and fluidity of the reaction medium.

4. The process for preparing phosphated or nitrophosphated fertilizer according to claim 1 wherein said ammonia is previously mixed with the rock pulp stream, after pressure reduction to an intermediate pressure condition, thus causing a water reduction in the process or a temperature increase in said tubular reactor.

5. The process for preparing phosphated or nitrophosphated fertilizer according to any one of claims 1, 2, 3, 4, wherein said sulfuric acid concentration is from 95 to 98% by weight.

6. The process for preparing phosphated or nitrophosphated fertilizer according to any one of claims 1, 2, 3, 4, wherein said phosphoric acid concentration is between 51 and 55% by weight of $P_2O_5$.

7. The process for preparing phosphated or nitrophosphated fertilizer according to any one of claims 1, 2, 3, 4, wherein all the heat produced in the reaction is substantially employed for vaporization of the process water.

8. The process for preparing phosphated or nitrophosphated fertilizer according to any one of claims 1, 2, 3, 4, wherein said fertilizer obtained is easily granulated by conventional granulation equipment or used directly in slurried fertilizer compositions.

9. The process claimed in claim 1 wherein ammonia is introduced into said tubular reactor before step (b) and wherein said acid with ammonia reacts with said pulp.

10. The process claimed in claim 1 wherein ammonia is introduced into said tubular reactor after step (b) and wherein said acid with said ammonia reacts with said pulp.

* * * * *